July 3, 1951  F. D. DOLAN  2,558,829
ROTARY POWER HANDSAW WITH QUICK LOCKING ADJUSTMENTS
Filed July 7, 1950  2 Sheets-Sheet 1
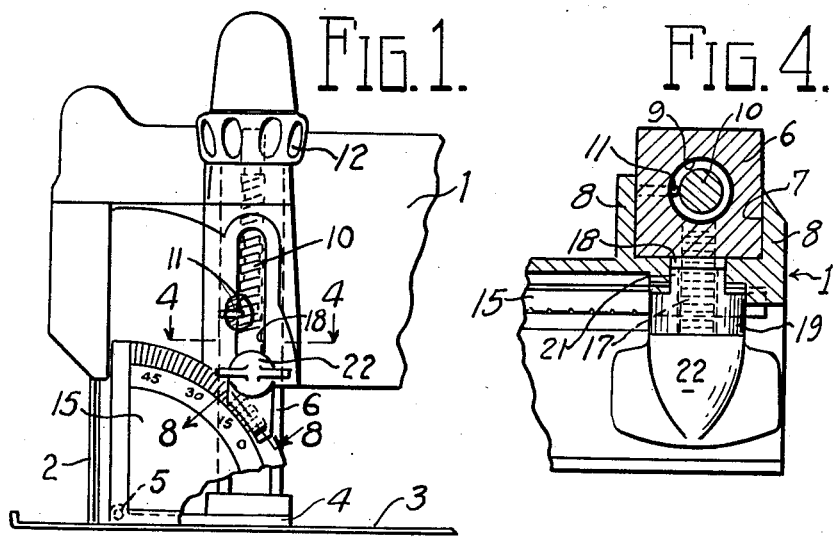
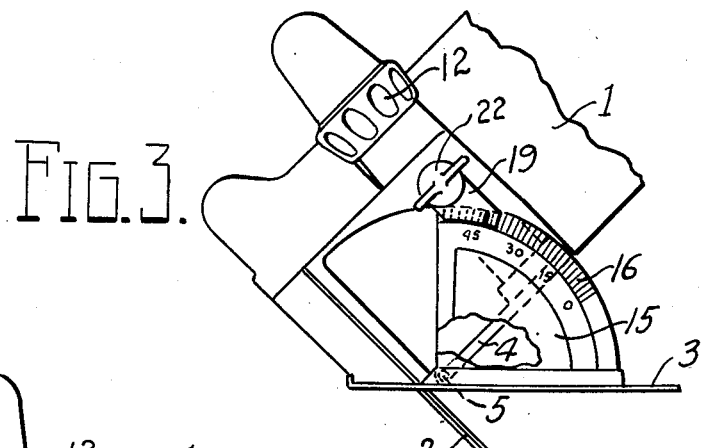
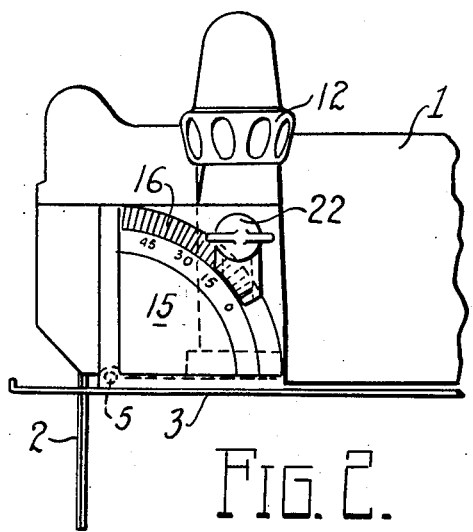
INVENTOR.
Francis D. Dolan
BY Owen & Owen
ATTORNEYS July 3, 1951 F. D. DOLAN 2,558,829
ROTARY POWER HANDSAW WITH QUICK LOCKING ADJUSTMENTS
Filed July 7, 1950 2 Sheets-Sheet 2
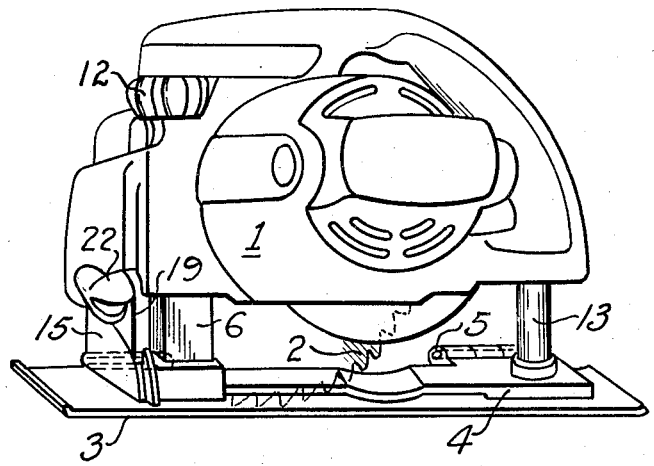
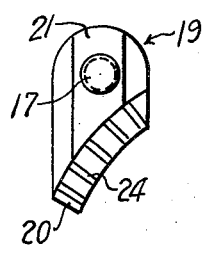
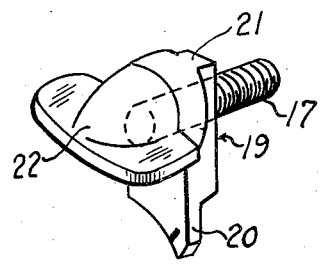
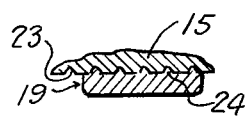
INVENTOR.
Francis D. Dolan
BY Owen & Owen
ATTORNEYS Patented July 3, 1951

2,558,829

UNITED STATES PATENT OFFICE 2,558,829

ROTARY POWER HANDSAW WITH QUICK LOCKING ADJUSTMENTS

Francis D. Dolan, Toledo, Ohio, assignor to The American Floor Surfacing Machine Company, Toledo, Ohio, a corporation of Ohio Application July 7, 1950, Serial No. 172,423

5 Claims. (Cl. 143—43)

This invention relates to rotary saws of the portable hand type, and particularly to such saws wherein the body frame that carries the saw and its driving means is supported by a base member for both tilting and depth cutting adjustments relative thereto. The invention relates particularly to improvements on the mounting and adjusting means for the rotary power hand saw disclosed in the application Serial No. 751,012 filed by me jointly with Louis Vavrik and now abandoned.

The object of this invention is the provision of simple and efficient unitary means for locking both the tilting and depth cutting adjustments of the body frame relative to the base member of an apparatus of the class described, or releasing them for such adjustments, whereby a single operation of the means will act to either lock said relatively movable parts against both of said adjustments or to release them for either or both adjustments.

Further objects and advantages of the invention will be apparent from the following detailed description, and from the accompanying drawings illustrating one embodiment thereof, in which—

Fig. 1 is a fragmentary front elevation of a rotary power hand saw embodying the invention, with the body frame of the saw in raised relation to the base plate, and with parts broken away; Fig. 2 is a similar fragmentary view of the power saw, with the body frame in lowered relation to the base plate; Fig. 3 is a view similar to Fig. 2, with the body frame tilted relative to the base frame and with a part of the gauge plate broken away; Fig. 4 is an enlarged sectional detail on the line 4—4 in Fig. 1; Fig. 5 is a perspective end view of a power saw embodying the invention, with the body frame clamped in raised relation to the base plate; Fig. 6 is an inner side view of the clamping means removed from the apparatus; Fig. 7 is a perspective elevation of the clamping means, and Fig. 8 is an enlarged section on the line 8—8 in Fig. 1.

Referring to the drawings, 1 designates the body frame of a portable hand saw embodying the invention and 2 the rotary saw projecting downward from one side thereof and mounted on a driven shaft (not shown) that has its bearings and driving means within the frame, as well understood in the art. The frame 1 is mounted on a base plate 3 for tilting adjustment about an axis normal to the plane of rotation of the saw and also for adjustment toward and away from the plate and independent of its angular adjustment to vary the depth of cut of the saw.

The mounting means for the frame 1 comprises a top plate 4 hinged to the base plate 3 at 5, a post or standard 6 rising from the plate 4 in a plane normal thereto, a guiding connection between the body frame and standard permitting adjusting movements of the frame lengthwise of the standard, and a screw connection between the frame and standard operable to effect said latter adjustment, all of which are broadly present in said application.

In the present invention, the body frame 1, which has an open bottom and is hollow in advance of the saw driving parts therein, has its front wall, which is transverse to the saw and provided on its inner side with a guide groove or channel 7, formed, in the present instance, by the front wall and by parallel flanges 8, 8 (Fig. 4) on its inner surface with said groove normal to the bottom edge of the plate. The post or standard 6, which rises rigidly from the top plate 4, fits lengthwise in the groove 7 for longitudinal adjusting movements therein, thus guiding the frame for adjusting movements toward and away from or normal to the plate 4 of the mounting base structure for the purpose of varying the cutting depth of the saw.

The post or standard 6 has an axially disposed bore 9 extending downward therein from its top for receiving an adjusting screw 10 that projects through the registering top portion of the frame 1 and is held against axial movements therein but permitted to have free rotary movements. This screw preferably has a box type thread that is engaged within the post bore by a pin 11 mounted transversely in the post. Any other type of thread engagement between the screw and post may, however, be used. A control knob or head 12 is fixed on the upper end of the screw 10 in exposed position at the top of the frame. It is thus apparent that a turning of the screw will effect a raising or lowering of the frame relative to the supporting post 6 and in a plane normal to the plate 4.

The plate 4, in addition to carrying the frame guide post or standard 6, is preferably provided adjacent to its opposite end with a second guide post 13 which has guiding connection with a registering part (not shown) of the body frame. This feature, however, forms no part of the present invention.

Fixedly rising from the base plate 3 at the forward end of the plate 4 and immediately in front of the body frame is a segmental gauge plate 15 having at its curved edge an arcuate series of graduations 16 indicating degrees of tilting adjustment of the frame relative to the base plate 3. The arc of the scale is concentric to the hinge axis 5 of the plate 4.

The dual coupling means for locking the body frame 1 in adjusted relation both to the supporting post 6 and to the gauge plate 15, and in which the present invention primarily resides, includes a clamping screw 17 threaded into the front side of the post 6 and projecting freely forward therefrom through a registering slot 18 provided lengthwise in the bottom of the guide groove 7 and through the front wall of the body frame. This screw also projects freely through a clamping block 19 that has a lip end 20 overlapping the edge of the gauge plate 15. The block 19 has a web projection 21 at its inner side slidingly fitting in the frame slot 18 to prevent turning of the block relative to the body frame. The outer end of the screw 17 has a head 22 shouldering against the clamping block 19 and preferably formed with wings to facilitate hand turning.

It is apparent that a turning-in or tightening of the screw 17 will not only draw the lip 20 of the plate 19 into clamping engagement with the arcuate edge of the gauge plate 15 to lock the frame 1 against tilting adjustment relative thereto, but will also draw the supporting post 6 firmly to its seat in the guide groove 7 and clamp the frame in adjusted relation on the post. It is preferable to provide the outer marginal arcuate edge surface of the gauge plate 15 with a series of radial serrations 23 (Fig. 7) with which an arcuate series of complemental serrations 24 on the inner side of the clamping block lip 20 (Fig. 6) may engage. The gauge plate 15 bears at its inner or rear side against the front wall of the body frame so that it is braced by the frame against the clamping action of the block 19.

This unitary clamping means materially facilitates adjustments of a saw of the character described, as a loosening of the screw 17 frees the body frame for both tilting and depth cutting adjustments, and a tightening thereof locks the frame in both of said adjustments relative to the base plate 3.

I wish it understood that my invention is not limited to any specific construction, arrangement or form of the parts, as it is capable of numerous modifications and changes without departing from the spirit of the claims.

Having thus described my invention, what I claim as new, and desire to secure by United States Letters Patent, is:

1. In a rotary power hand saw including a base plate, a top plate hinged thereon, a guide post rising from said top plate for tilting adjustment therewith, a saw and power carrying body frame mounted on said post for adjustment lengthwise thereof, and a screw adjusting means connecting said post and frame, the combination of an arcuate member on said base plate, and means having cooperating members, one coacting with said post and the other with said arcuate member and operable to clamp both said parts to prevent movements of the body frame relative thereto and also operable to release said parts.

2. In a rotary power hand saw including a base plate, a top plate hinged thereon, a guide post rising from said top plate for tilting adjustment therewith, a saw and power carrying body frame mounted on said post for adjustment lengthwise thereof, and a screw adjusting means connecting said post and frame, the combination of an arcuate member on said base plate, and means including a clamp engageable with said arcuate member and a screw engageable with both said post and clamp and operable to hold the frame against adjusting movements relative to both the post and said arcuate member or to release them for said adjustments.

3. In a rotary power hand saw including a base plate, a top plate hinged thereon, a guide post fixedly rising from said top plate for tilting adjustment therewith relative to the base plate, a saw and power carrying body frame mounted on said post for tilting adjustment therewith and adjustment lengthwise thereof relative to the base plate, a screw adjusting means connecting said post and frame, and a tilting adjustment gauge plate on said base plate, the combination of a member for clamping engagement with the gauge plate, and means engaging both said member and guide post and operable by a single action to clamp said post to said frame and said member to said guide plate or to release the clamping engagement of said parts.

4. In a rotary power hand saw including a base plate, a top plate hinged thereon, a guide post fixedly rising from said top plate for tilting adjustment therewith relative to the base plate, a saw and power carrying body frame mounted on said post for tilting adjustment therewith and adjustment lengthwise thereof relative to the base plate, means connecting the post and frame and operable to effect predetermined relative adjustments thereof, and a tilting adjustment gauge plate on said base plate, the combination of a member guided by the frame for movement relative thereto lengthwise of the guide post, said member having a part overlapping an edge of the gauge plate for clamping engagement therewith, and a screw projected through said member and threaded into said post and operable to draw the post into clamping engagement with the frame to prevent relative movements thereof and also to cause said member to have clamping engagement with said gauge plate to prevent relative movements of the frame and plate.

5. In a rotary power hand saw, a body frame having a vertical guide groove in a wall thereof, a base plate for said frame, a top plate hingedly mounted on said base plate for tilting adjustment relative thereto, a guide post fixedly rising from said top plate and engaging in said frame groove to guide movements of the frame toward and away from the top plate, screw means connecting said frame and post and operable to effect said relative adjustment of the frame and post, an arcuate plate fixed to said base plate with its arcuate edge concentric to the hinge axis of said top plate, a clamping block for engagement with the marginal edge portion of the arcuate plate, a screw projected through said block and threaded into said post and operable to simultaneously clamp the post in adjusted position to the frame and said block in adjusted position to said arcuate plate, said frame having a slot at the side of said post lengthwise thereof through which said screw projects.

FRANCIS D. DOLAN.

REFERENCES CITED

The following references are of record in the file of this patent:

UNITED STATES PATENTS

| Number | Name | Date |
|---|---|---|
| 1,566,824 | Carter | Dec. 22, 1925 |
| 1,848,330 | Emmons | Mar. 8, 1932 |